(12) United States Patent
Strohm et al.

(10) Patent No.: US 11,021,661 B2
(45) Date of Patent: Jun. 1, 2021

(54) HEAVY FOSSIL HYDROCARBON CONVERSION AND UPGRADING USING RADIO-FREQUENCY OR MICROWAVE ENERGY

(75) Inventors: James J. Strohm, West Richland, WA (US); John C. Linehan, Richland, WA (US); Benjamin Q. Roberts, Richland, WA (US); Douglas L. McMakin, Richland, WA (US); David M. Sheen, Richland, WA (US); Jeffrey W. Griffin, Kennewick, WA (US); James A. Franz, Kennewick, WA (US); Charlene Franz, legal representative, Kennewick, WA (US)

(73) Assignee: Battelle Memorial Institute, Richland, WA (US)

(*) Notice: Subject to any disclaimer, the term of this patent is extended or adjusted under 35 U.S.C. 154(b) by 1293 days.

(21) Appl. No.: 13/401,216

(22) Filed: Feb. 21, 2012

(65) Prior Publication Data

US 2013/0213795 A1    Aug. 22, 2013

(51) Int. Cl.
*C10G 32/02* (2006.01)
*B01J 19/12* (2006.01)
(Continued)

(52) U.S. Cl.
CPC .......... *C10G 32/02* (2013.01); *B01J 19/0093* (2013.01); *B01J 19/088* (2013.01); *B01J 19/126* (2013.01);
(Continued)

(58) Field of Classification Search
CPC ................................. C10G 1/00; C10G 15/00
(Continued)

(56) References Cited

U.S. PATENT DOCUMENTS 3,503,865 A * 3/1970 Stone ........................... 208/402
3,619,404 A * 11/1971 Rieve et al. .............. 208/310 R
(Continued)

FOREIGN PATENT DOCUMENTS

| AP | AP/P/2014/007878 | 10/2016 |
|---|---|---|
| CA | 2314356 | 4/2000 |

(Continued)

OTHER PUBLICATIONS

Graves, Reactions of Coal in a Plasma Jet, Sep. 4, 1964, American Chemical Society, p. 118-124.*

(Continued)

*Primary Examiner* — Michelle Stein
(74) *Attorney, Agent, or Firm* — Wells St. John P.S.

(57) ABSTRACT

Conversion of heavy fossil hydrocarbons (HFH) to a variety of value-added chemicals and/or fuels can be enhanced using microwave (MW) and/or radio-frequency (RF) energy. Variations of reactants, process parameters, and reactor design can significantly influence the relative distribution of chemicals and fuels generated as the product. In one example, a system for flash microwave conversion of HFH includes a source concentrating microwave or RF energy in a reaction zone having a pressure greater than 0.9 atm, a continuous feed having HFH and a process gas passing through the reaction zone, a HFH-to-liquids catalyst contacting the HFH in at least the reaction zone, and dielectric discharges within the reaction zone. The HFH and the catalyst have a residence time in the reaction zone of less than 30 seconds. In some instances, a plasma can form in or near the reaction zone.

14 Claims, 4 Drawing Sheets

(51) Int. Cl.

| | |
|---|---|
| *H05H 1/46* | (2006.01) |
| *B01J 19/00* | (2006.01) |
| *B01J 19/08* | (2006.01) |
| *C10G 9/24* | (2006.01) |
| *C10G 1/02* | (2006.01) |
| *C10G 1/00* | (2006.01) |
| *C10G 1/08* | (2006.01) |
| *C10G 15/08* | (2006.01) |

(52) U.S. Cl.
CPC ............... *C10G 1/00* (2013.01); *C10G 1/02* (2013.01); *C10G 1/08* (2013.01); *C10G 9/24* (2013.01); *C10G 15/08* (2013.01); *H05H 1/46* (2013.01); *B01J 2219/0086* (2013.01); *B01J 2219/00792* (2013.01); *B01J 2219/00822* (2013.01); *B01J 2219/00826* (2013.01); *B01J 2219/00835* (2013.01); *B01J 2219/00941* (2013.01); *B01J 2219/0894* (2013.01); *B01J 2219/1215* (2013.01); *B01J 2219/1227* (2013.01); *B01J 2219/1239* (2013.01); *B01J 2219/1245* (2013.01); *B01J 2219/1269* (2013.01); *B01J 2219/1272* (2013.01); *H05H 2001/4622* (2013.01)

(58) Field of Classification Search
USPC ........................................................ 208/402
See application file for complete search history.

(56) References Cited

U.S. PATENT DOCUMENTS

| | | | | |
|---|---|---|---|---|
| 3,796,650 | A * | 3/1974 | Urban ................ | 208/435 |
| 4,180,452 | A | 12/1979 | Sinor | |
| 4,243,509 | A * | 1/1981 | Sinor ................ | C10G 1/06 |
| | | | | 208/408 |
| 4,279,722 | A | 7/1981 | Kirkbride | |
| 4,487,683 | A | 12/1984 | Bozzuto | |
| 4,941,965 | A * | 7/1990 | Amouroux ........ | C10G 47/30 |
| | | | | 208/107 |
| 5,015,349 | A | 5/1991 | Suib et al. | |
| 5,026,949 | A * | 6/1991 | Amouroux ........ | C10G 47/30 |
| | | | | 585/648 |
| 5,328,577 | A * | 7/1994 | Murphy ............ | B01J 12/002 |
| | | | | 204/157.43 |
| 6,171,479 | B1 | 1/2001 | Ovalles et al. | |
| 6,184,427 | B1 | 2/2001 | Klepfer et al. | |
| 6,284,105 | B1 * | 9/2001 | Eliasson et al. .... | 204/165 |
| 6,451,174 | B1 | 9/2002 | Burkitbaev | |
| 7,387,712 | B2 | 6/2008 | Purta et al. | |
| 7,629,497 | B2 | 12/2009 | Pringle | |
| 2003/0042172 | A1 | 3/2003 | Sharivker et al. | |
| 2003/0094452 | A1 | 5/2003 | Burkitbaev | |
| 2004/0031731 | A1 | 2/2004 | Honeycutt et al. | |
| 2004/0074759 | A1 | 4/2004 | Purta et al. | |
| 2005/0167260 | A1 | 8/2005 | Kong et al. | |
| 2006/0073084 | A1 | 4/2006 | Burkitbayev | |
| 2007/0102279 | A1 * | 5/2007 | Novak .............. | A62D 3/178 |
| | | | | 204/157.6 |
| 2008/0124253 | A1 | 5/2008 | Schmidt et al. | |
| 2009/0064581 | A1 | 3/2009 | Nielsen et al. | |
| 2010/0105119 | A1 * | 4/2010 | Medoff ............. | C10G 1/00 |
| | | | | 435/161 |
| 2010/0108492 | A1 | 5/2010 | Ishmukhametov et al. | |
| 2010/0215554 | A1 | 8/2010 | Dighe et al. | |
| 2010/0307960 | A1 * | 12/2010 | Lissianski et al. .... | 208/402 |
| 2011/0230688 | A1 | 9/2011 | Charon et al. | |
| 2011/0239542 | A1 | 10/2011 | Liu et al. | |
| 2011/0240567 | A1 | 10/2011 | Zolezzi-Garreton | |
| 2011/0243802 | A1 | 10/2011 | Ringheim et al. | |
| 2011/0253362 | A1 | 10/2011 | Banerjee et al. | |
| 2011/0253363 | A1 | 10/2011 | Banerjee et al. | |

| | | |
|---|---|---|
| 2012/0024843 A1 | 2/2012 | Lissianski et al. |
| 2012/0029252 A1 | 2/2012 | Lissianski et al. |
| 2012/0055851 A1 | 3/2012 | Kyle |

FOREIGN PATENT DOCUMENTS

| | | | |
|---|---|---|---|
| CN | 101747922 | | 6/2010 |
| EP | 0601798 A1 | | 6/1994 |
| EP | 12869276.1 | | 9/2015 |
| WO | WO 00/22068 | * | 4/2000 |
| WO | WO 02/38523 A1 | | 5/2002 |
| WO | WO 2012/023858 | | 2/2012 |
| WO | WO | | 8/2014 |
| | PCT/US2012/066025 | | |

OTHER PUBLICATIONS

McDonald, Plasma Reactions with Powdered Coal, Department of Fuels Engineering, University of Utah, Jun. 1966.*
Kim, Nonthermal Plasma Effects on Hydrogasification of Coal, Los Alamos National Laboratory, 2007, IEEE.*
Bodily, David M., et al., "Microwave Pyrolysis of Coal and Related Hydrocarbons," University of Utah-Department of Mining, Metallurgical and Fuels Engineering, pp. 221-226, 1973, United States.
Boutot, T., et al. "High-Concentration Hydrogen Production from Natural Gas Using a Pulsed Dielectric Barrier Discharge," 2004, pp. 1-14, Canada.
Cho, Hee Yeon, et al., "Microwave Flash Pyrolysis," Journal of Organic Chemistry, vol. 74, pp. 4137-4142, 2009, United States.
Fu, Yuan C., et al., "Pryolysis of Coals in a Microwave Discharge," American Chemcial Society, vol. 8, No. 2, 1969, pp. 257-262, United States.
Hascakir, Berna, et al., "Microwave-Assisted Heavy Oil Production: An Experimental Approach," Energy Fuels, 2009, pp. 6033-6039, United States.
Hussain, Zahid, et al., "Microwave-metal interaction pyrolysis of polystyrene," Journal of Analytical and Applied Pyrolysis, 2010, pp. 39-43, Netherlands.
Jasinski, M., et al., "Application of atmospheric pressure microwave plasma source for production of hydrogen via methane reforming," The European Physical Journal D, vol. 54, 2009, pp. 179-183, United States.
Kelland, D.R., et al. "HGMS Coal Desulfurization with Microwave Magnetization Enchancement," IEEE Transaction on Magnetics, vol. 24, No. 6, 1988, pp. 2434-2436, United States.
Mlotek, M., et al., "The hybrid plasma-catalytic process for non-oxidative methane coupling to ethylene and ethane", Applied Catalysis A: General, vol. 366, 2009, pp. 232-241, Netherlands.
Monsef-Mirazai, et al., "Rapid microwave Pyrolysis of coal," Fuel, vol. 74, No. 1, 1995, pp. 20-27, Netherlands.
Nicholson, A., et al., "Plasma Pyrolysis of Coal," Nature Publishing Group, vol. 236, 1972, pp. 397-400, United Kingdom.
Sharkey, A. G., et al., "Gases from Flash and Laser Irradiation of Coal," Nature Publishing Group, vol. 202, 1964, pp. 988-989, United Kingdom.
Wang, Nan, et al., "Experimental Study on Microwave Pyrolysis of an Indoesian Low-Rank Coal," American Chemical Society, 2013, pp. 254-263, United States.
Yagmur, Emine, et al., "Part 1. The Effect of Microwave Receptors on the Liquefaction of Turkish Coals by Microwave Engery in a Hydrogen Donor Solvent," Engery & Fuels, vol. 19, 2005, pp. 2480-2487.
Kamei, Osamu, et al., "Brown coal conversion by microwave plasma reactions under successive supply of methane," Fuel, 1998, pp. 1503-1506, vol. 77, Elsevier Science, Ltd., Japan.
Tanner, Dennis D., et al., "The Catalytic Conversion of C1-Cn Hydrocarbons to Olefins and Hydrogen: Microwave-Assisted C—C and C—H Bond Activation," American Chemical Society, 2001, pp. 197-204, vol. 15, Energy & Fuels, Alberta, Canada and Richland, Washington, USA.
International Search Report/Written Opinion for International application No. PCT/US2012/066025, International filing date Nov. 20, 2012, dated Mar. 26, 2013.

(56) References Cited

OTHER PUBLICATIONS

Sun et al., "Review on Microwave-Matter Interaction Fundamentals and Efficient Microwave-Associated Heating Strategies", Materials, Mar. 25, 2016, Issue 9, vol. 231, 25 pages, United States.

* cited by examiner

HEAVY FOSSIL HYDROCARBON CONVERSION AND UPGRADING USING RADIO-FREQUENCY OR MICROWAVE ENERGY

STATEMENT REGARDING FEDERALLY SPONSORED RESEARCH OR DEVELOPMENT

This invention was made with Government support under ARPA Order No. Z075/00, Program Code 9620 issued by DARPA/CMO under Contract HR0011-10-0088. The US Government has certain rights in the invention.

BACKGROUND

Traditional liquefaction methods for coal, and other heavy fossil hydrocarbons (HFH), can be divided into two general categories. The first is indirect liquefaction, where the coal is first gasified to synthesis gas that is then used for chemical and fuel production. The second method is direct liquefaction, where the coal chemicals and fuels are either extracted/refined from the coal or the coal undergoes a series of thermochemical reactions. Most of these traditional methods of coal liquefaction have significant energy requirements and environmental impact. Conventional techniques for direct coal liquefaction will generally result in lower $CO_2$ emissions compared to indirect techniques, but will typically require relatively higher temperatures and higher pressure hydrogen to obtain significant product yield and quality. Operation at high temperature and high pressure results in high energy requirements, water consumption, and capital costs. Therefore, alternative methods for conversion of HFH to value-added chemicals and fuels are required to reduce the capital costs, the operating costs, and the environmental impact of HFH liquefaction and in order to make facilities such as coal-to-liquids (CTL) plants feasible.

SUMMARY

This document describes a system that utilizes microwave (MW) and/or radio-frequency (RF) energies to convert HFH to a variety of value-added chemicals and/or fuels. For example, direct generation of acetylene, olefins, naphtha, naphthalenes, benzene, toluene, xylene (BTX), polyaromatics, paraffins, and fuel precursors from flash conversion of coal in inert atmospheres has been observed. Addition of hydrogen and/or methane can further increase direct fuel production and hydrogenation of HFH-derived liquids even when operating at atmospheric pressure and at modest temperatures. Variations of reactants, process parameters, and reactor design, within the scope of the present invention, can significantly influence the relative distribution of chemicals and fuels generated as the product.

One embodiment is a system for the continuous flash conversion of HFH using microwave and/or radio-frequency energy. The system comprises a source emitting microwave or RF energy that is concentrated in and/or through a reaction zone having a pressure greater than 0.9 atm, a continuous feed comprising HFH and a process gas flowing through the reaction zone, a HFH-to-liquids (HFHTL) catalyst contacting the HFH in at least the reaction zone, and dielectric discharges within the reaction zone. Contact between the HFH and the catalyst can include physical contact between separate particles (or the liquid) entrained in the gas, particles comprising a mix of the HFH and catalyst in close proximity within the process gas, and/or HFH with catalytically active species directly impregnated on the HFH particles and/or within the pores of the HFH. For example, the catalyst or catalyst precursors, which can include various metal/metal oxide salts, organometallic species, or nano-metal/metal oxide particles, can be impregnated in the HFH using aqueous or organic solvents. The HFH and the catalyst have a residence time in the reaction zone of less than 5 minutes. Preferably, the residence time is less than 30 seconds, and can be approximately tens of microseconds. In some instances, a plasma can form in or near the reaction zone.

Another embodiment includes a method for continuous flash conversion of HFH. The method comprises the steps of flowing a continuous feed comprising HFH and a process gas through a reaction zone. The pressure in the reaction zone is greater than 0.9 atm. The HFH and an HFHTL catalyst are contacted in at least the reaction zone. The method further comprises concentrating microwave or RF energy in the reaction zone and generating dielectric discharges within the reaction zone. The HFH and the catalyst have a residence time in the reaction zone of less than 30 seconds.

As used herein, continuous refers to systems and methods in which reactants are continuously fed through the reaction zone and continuously emerge as products and/or waste in a flowing stream.

Examples of suitable process gases include, but are not limited to, nitrogen, carbon dioxide, methane, natural gas, recycle gas, carbon monoxide, argon, helium, water vapor, oxygen, and combinations thereof. Preferably, the process gas comprises a hydrogen-containing gas. As used herein, pyrolysis refers to the thermochemical decomposition of HFH material without the participation of $O_2$. In instances where the process gas includes water vapor and/or $O_2$, some combustion may occur. However, the ratio of O to C less than one and pyrolysis is still the predominant reaction, and the process may be herein broadly referred to as "pyrolysis" or "conversion." Generally, the HFH concentration in the total process gas should be sufficient for reactor operation while the gas feed can be as low as possible to ensure steady operation. In a particular embodiment, the HFH concentration in the total gas flow is greater than or equal to 0.1 wt % and less than 100 wt %. When the process gas comprises hydrogen-containing reactive gases, the concentration is preferably greater than 3 grams of HFH per gram of reactive gas. In some embodiments, the concentration may be greater than 6 grams of HFH per gram of reactive gas.

The reaction zone can exist within a reactor having a variety of configurations including, but not limited to, a fluidized bed reactor, an entrained flow reactor, a free fall reactor, or a moving bed reactor. The pressure in the reaction zone is, preferably, less than 7 atmospheres. The residence time of reactants in the reaction zone is, preferably, greater than or equal to 5 milliseconds and under 30 seconds. The source can be arranged to emit microwave or RF energy at any angle from parallel to perpendicular to the flow direction in the reaction zone. Furthermore, the energy can pass through the reactor walls defining, in part, the reaction zone. Alternatively, the energy can be emitted directly from or into the reaction zone by proper placement of the source, or by proper placement of an antenna or waveguide at or within the reaction zone. Emission directly into the reaction zone improves efficiency and eliminates the need to transmit through reactor walls.

In various embodiments, the catalyst comprises a promoter of hydrogenation, a promoter of electrical discharge, and/or a promoter of hydrogen formation. The catalyst can also be a dilution material. Examples of catalysts can include, but are not limited to materials containing iron, nickel, cobalt, molybdenum, carbon, copper, alumina, silica, oxygen and combinations. Other catalysts may include iron and/or char. In some embodiments, the catalyst and the HFH can be admixed. In some embodiments, concentrations of the catalyst in the process gas can be between 0 wt % and 30 wt % or between 0.5 wt % and 10 wt %.

As used herein, HFH can refer to bitumen, coal of any rank (i.e., bituminous, sub-bituminous, lignite, etc.), oil sands (i.e., bitumen containing ores), oil shale, petroleum resids, asphaltenes and pre-asphaltenes, and any other kerogen-containing materials. HFH can also refer to biomass, plastics, municipal waste, sludge, or other carbon-rich materials.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
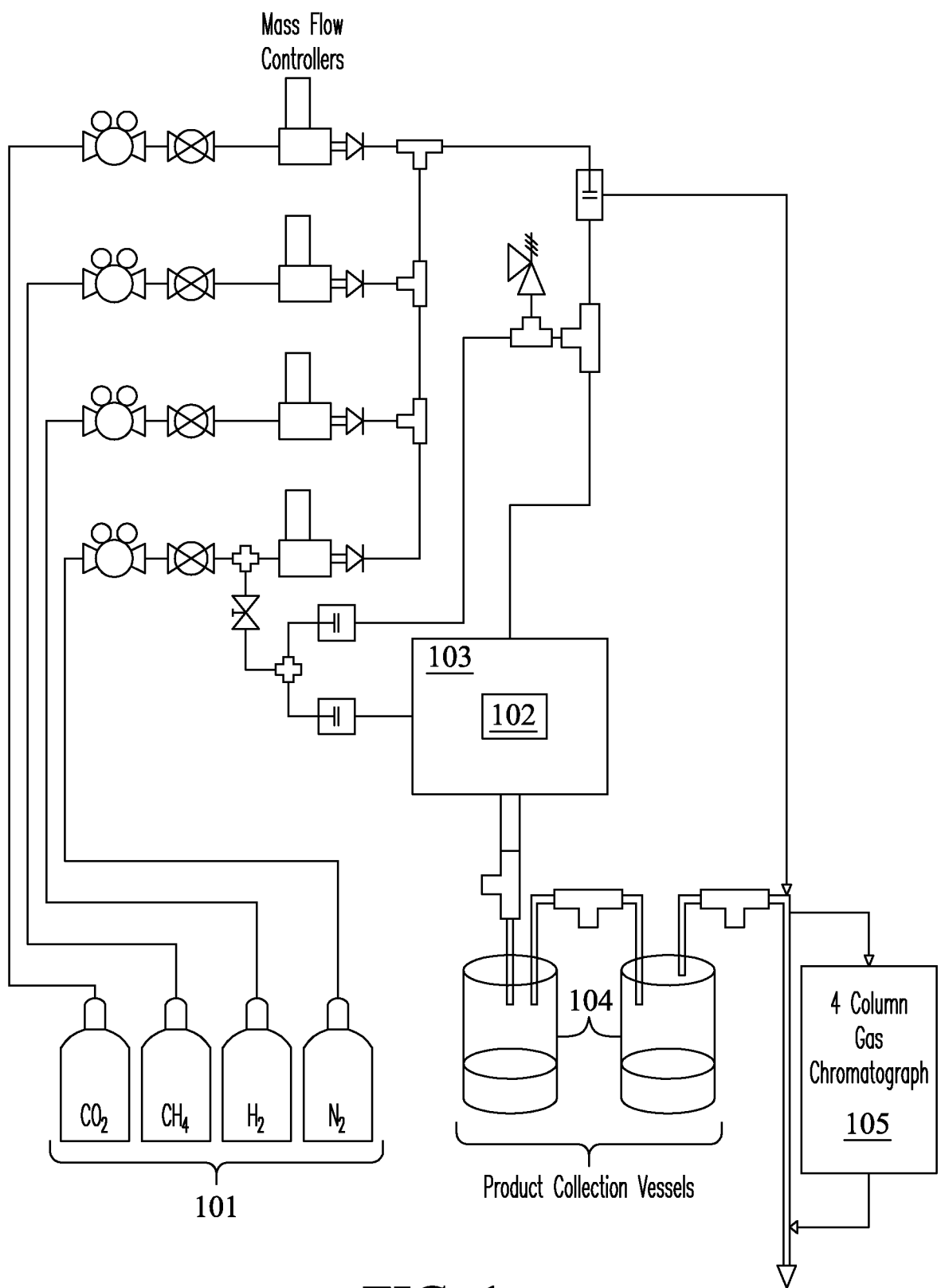
FIG. 1 is a diagram of a static, semi-batch, system for coal conversion using microwave energy.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

Flash-heating and/or quenching of products can prevent retrogressive reactions typically associated with conventional HFH conversion, while selectively heating only the HFH can reduce process and thermal inefficiencies. Embodiments of the present invention utilize selective flash-heating of the HFH and/or HFHTL catalyst while keeping the bulk media at temperatures below pyrolytic conditions, thus effectively quenching the volatilized products or oils by the cooler bulk media. The selective flash heating can be accomplished through dielectric discharges created by uneven charge build up between or within HFH and/or catalyst particles, introducing the HFH and/or catalyst into a plasma, or rapid heating as a result of introducing microwave and/or RF irradiation.

Embodiments described in this document encompass adsorption of radio frequency (RF) or microwave energy at a frequency in which heating of moisture is not the primary mode of heating or absorption of RF or microwave energy. Rather, heating and absorption of the RF or microwave energy can be achieved through semiconductor materials, which can include a hybrid HFHTL catalyst impregnated within the HFH or the HFH itself, until dielectric collapse occurs within and/or between the HFH, the catalyst particles, and/or the reactor components (e.g., reactor walls, wave-guide components, or conductive or semiconductor materials placed within the reactor) due to non-uniform charge build up on the HFH particles, catalysts, and/or reactor components. In some instances, the dielectric collapse can result in plasma discharge. Within each discharge, temperatures within the immediate region of the discharge can approach and even exceed 1500° C., but are typically quenched by the surroundings within microseconds. Regardless of the temperature in and near the discharge, there is minimal change to the bulk temperature in the reactor and/or reaction zone. As a result of the discharge, dramatic cleavage and rearrangement of organic structure can occur at the spark discharge source particle and the immediate surroundings (ca. 0.1 cm). Any products and volatile matter are then released from the HFH into the surrounding media, which remains relatively cool. A plasma created locally in the immediate region of a particle or preformed in the reaction zone generates reactive ion species (e.g. H, C, $CH_x$, Ar, O, or N ions) that can readily interact directly with the HFH, with the released products and volatile matter, or with other reactive ions that can act as a catalytic initiator for the decomposition, hydrogenation, dehydrogenation, and other reactions that converts the HFH and/or reactive gas into different species.

By avoiding excessive heating of the bulk media, retrogressive and decomposition reactions can be reduced, which can improve liquid yields by "extreme flash" conversion and/or conversion. With RF or microwave induced conversion, thermal energy (e.g., from a combustion source) is minimized or eliminated and the energy that is required for liquefaction is concentrated and/or targeted within the reaction zone, instead of across the entire reactor and its contents as with a conventional thermal flash pyrolyzer, which has relatively high thermal inefficiencies.

The following tables and figures demonstrate and describe a variety of aspects and embodiments and were obtained using a high volatile bituminous Pitt #8 coal as a representative HFH. Unless specified otherwise the coal was used as received without drying or demineralization. The size of the coal was reduced to 60 mesh (<0.25 mm). To avoid plugging issues, the particle size range of the coal was narrowed to 100-200 mesh (74-149 micron) for most of the examples described herein. Proximate and Ultimate analysis of the Pittsburgh seam coal used as a representative HFH is shown in Table 1 and Table 2, respectively.

TABLE 1

Proximate Analysis of Pitt #8 Coal (DECS-23)
Proximate Analysis

|  | as rec'd | dry | daf | dmmf (Parr) |
|---|---|---|---|---|
| % Moisture | 2.00 | — | — | — |
| % Ash | 9.25 | 9.44 | — | — |
| % Vol. Matter | 38.63 | 39.42 | 43.53 | 42.33 |
| % Fixed Carbon | 50.12 | 51.14 | 56.47 | 57.67 |
|  | 2.50% equilibrium moisture | | | |

TABLE 2

Ultimate Analysis of Pitt #8 Coal (DECS-23)
Ultimate Analysis

|  | as rec'd | dry | daf | dmmf (Parr) |
|---|---|---|---|---|
| % Ash | 9.25 | 9.44 | — | (12.32% MM) |
| % Carbon | 72.72 | 74.21 | 81.95 | 84.64 |
| % Hydrogen | 5.00 | 5.10 | 5.63 | 5.82 |
| % Nitrogen | 1.32 | 1.35 | 1.49 | 1.54 |
| % Total Sulfur | 3.79 | 3.87 | 4.27 | — |
| % Oxygen (diff.) | 5.91 | 6.03 | 6.66 | 8.00 |

Referring first to FIG. 1, the diagram depicts a static coal reactor 102 having a static coal bed, continuous flows from gas sources 101, online gas analysis device 105 such as a gas chromatograph, and one or more product collection vessels 104. The reactor 102 is shown within a microwave oven 103 that is used as a radiation source, although in practice the reactor may be integral with or connected to other types of microwave or RF energy sources. While embodiments described in this document encompass a continuous reactor, the static reactor is used to describe and demonstrate various aspects and principles. The microwave oven 103 was modified by removing the turntable and drilling of 2" holes through the top and bottom of the oven cavity to allow the insertion of a quartz reactor tube through the cavity. To avoid microwave leakage outside the microwave oven two aluminum flanges were bolted to the top and the bottom of the microwave oven. Each flange had a 1.05" O.D. tube opening that was 4.8" long. This permitted the safe operation of the microwave oven without electromagnetic field emissions as a result of passing the reactor tube through the oven cavity. The pressure in the reactor was greater than or equal to approximately 1 atm. Stable performance was maintained at atmospheric pressure through the maximum operating pressure of the test stand of 35 psig (2.4 atm) or 3.4 atm (absolute pressure). Pressures even beyond this are suitable.

1-2 grams of coal (<60 mesh, as rec'd) were inserted between two quartz wool plugs within a 10.5 mm ID (12.5 mm OD) quartz reactor tube. Three Ni-chrome alloy wires of ~40 mm in length were tightly intertwined together to form a single "rope" of ~25 mm in length, with three "spokes" on the top and bottom of the wire rope. The wire elements were typically inserted into the reactor tube prior to loading of the coal around the wires, and served as a microwave "antenna" to direct the microwave energy to the coal bed and to aid in the ignition of dielectric discharges throughout the coal bed. The reactor tube was then placed in a larger 0.75"OD (0.625"ID) quartz outer tube and the top and bottom of the reactor tube were sealed within the larger outer tube with Teflon® gaskets (outside the oven cavity). This enabled rapid reactor turnaround and more accurate mass balance calculations through weighing and loading of the inner tube.

Gas was introduced at a flow rate of 200 sccm (total) through the outer quartz tube using mass flow controllers. The Teflon® seals placed around the reactor tube force the gas through the static coal bed. The microwave time for the experiments varied between 30 seconds and 10 minutes. Products were collected in a series of cold traps, the first being chilled to ~0° C. and the second trap was chilled with dry-ice and propanol to a temperature of −78° C. The gas was then passed through an online-gas GC and then collected in a gas sample bag for further analysis and quantification of the gas formed/consumed during microwave conversion.

Baseline tetrahydrofuran (THF) extractions of as received Pitt #8 (DECS-23) coal in the batch reactor are shown in Table 3. The THF extractions were performed to assess the amount of extractable product without microwave or thermal treatments for direct comparison of the improvement in soluble products with application of various conversion energies. Extractions of Pitt #8 with THF yielded between 13 and 16 wt % THF soluble tars, with little to no pentane soluble oil yield.

TABLE 3

Baseline THF Extractable Yields from Pitt #8 (as rec')

| Coal | Initial Wt (g) | Wt THF Insoluble (g) | Wt 1st THF Extractables (g) | Wt 2nd THF Extractables (g) | Wt % THF Solubles | Mass Balance (%) |
|---|---|---|---|---|---|---|
| Pitt #8 | 2.1499 | 1.9881 | 0.2546 | 0.0228 | 13% | 105% |
| Pitt #8 | 2.1958 | 1.9859 | 0.2272 | 0.1139 | 16% | 102% |

Baseline thermal yields of Pitt #8 coal at 350° C. were performed at elevated pressures of inert and hydrogen gases, and the results are presented in Table 4. 350° C. was selected as the conversion temperature to determine if any pyrolytic or devolatilization reactions would occur during char-vapor separations within heated cyclones during experimental trials. As shown in Table 4, the effect of a conversion temperature of 350° C. had little influence on the net conversion of coal and the THF soluble tar yield was similar to the baseline THF extractable yields from Pitt #8. The effect of gas headspace of either nitrogen or hydrogen also showed little impact.

TABLE 4

| Baseline Thermal Conversion Yields of Pitt#8 Coal at 350° C. under 450 psi N₂ and | | | | | | | | |
|---|---|---|---|---|---|---|---|---|
| | | | THF Insolubles | | Gas Yield | | THF Soluble Tar | Mass |
| Coal | Pyrolysis Conditions | Coal loading | Wt. (g) | Wt % (as recv'd) | Wt. (g) | Wt % (as recv'd) | Wt. (g) | Wt % (as recv'd) | Balance (%) |
| Pitt #8 | 350° C., 1 hr, 450 psi N₂ | 1.01 | 0.836 | 82.77 | 0.0217 | 2.15 | 0.131 | 12.97 | 98.9% |
| Pitt #8 | 350° C., 1 hr, 450 psi H₂ | 1.00 | 0.818 | 81.80 | 0.0298 | 2.98 | 0.146 | 14.6 | 99.4% |

Initial coal conversion experiments were performed with various coal-to-liquids (CTL) catalysts within a static coal bed under flowing nitrogen gas in a quartz tube that is placed through an off-the shelf home microwave oven. With no catalyst, little to no coal conversion was observed at microwave exposure times of 5 minutes, as shown in Table 5. Doping the coal with 2-10 wt % of CTL catalysts (ferrihydrite and magnetite) and iron filings (40 mesh) also showed little to no effect on coal conversion and bed temperatures never exceeded 200° C. This indicated that poor MW energy transfer to the coal bed and/or the CTL catalysts and metal flakes were ineffective for facilitating MW heating or plasma discharges. Only in the case of experiment MWPy009 was any significant conversion of coal observed. This was also the only run in which dielectric discharges were observed, indicating that without the presence of dielectric discharges or a plasma the coal will not undergo any significant conversion.

TABLE 5

| Product Yields from Initial MW Conversion Experiments | | | | | | | | | |
|---|---|---|---|---|---|---|---|---|---|
| | | | MW time | Coal | Gas Yield | | Solid Yield | | Gas + Extract Yield | |
| Run ID: | Coal | Catalyst | (min) | Load (g) | wt | wt % | wt | wt % | wt | wt % |
| extraction | Pitt | none | 0 | 2.15 | 0 | 0 | 1.99 | 92.5% | 0.162 | 7.5% |
| MWPy007 | Pitt | none | 5 | 1.5 | 0 | 0.0% | 1.39 | 92.7% | 0.11 | 7.3% |
| MWPy008 | Pitt | 20 wt % Fe-Filings | 5 | 1.2 | 0 | 0.0% | 1.04 | 86.7% | 0.16 | 13.3% |
| MWPy009 | Pitt | SS wire | 5 | 1.5 | 0.15 | 10.1% | 0.80 | 53.3% | 0.70 | 46.7% |

TABLE 6

| An incomplete list of appropriate catalysts with summarization of the performance and certain characteristics of each catalyst. | | | |
|---|---|---|---|
| Class | Material (size) | Discharge Characteristics | Catalytic Potential |
| CTL Catalysts | Fe-filings (420 micron) | Intermittent discharging with blue plasma-induced glow, some heating | modest hydrogenation activity (CH4), highest BTX yield |
| | Fe-powder (~100 micron) | Dramatic discharging for entire 30 second duration, sample fused | not tested in static system, evaluating in continous system - potential to improve discharge w/smaller particles |
| | FeCS (nanocatalyst) | No response | Highest hydrogenolysis and deoxygenation activity under hydrogen flow |
| | Fe-ferrihydrite (nanocatalyst) | No response | good deoxygenation activity, modest hydrogenolysis activity |
| | FeS-JL (nanocatalyst) | No response | Highest oil yield w/methane feed (28 wt %), highest selectivity to JP-8 intermediates (2/3-ring aromatics) |
| Methane Conversion or Upgrading Catalysts | NiO (150-250 micron) | No response | low catalytic potential |
| | NiO-Reduced in H2 (150-250 micron) | Dramatic discharging, highest intensity and duration | high potential CH4 conversion; but requires catalyst pretreatment and recovery |
| | G-90: Promoted NiO/Al2O3 (150-500 micron) | No response | commercial methane reforming catalyst - low catalyst potential |
| | G-90: Promoted NiO/Al2O3 (<88 micron) | No response | commercial methane reforming catalyst - low catalyst potential |
| | USY (<150 micron) | No response | potential insitu upgrading - no discharge activity |
| | USY (.854-2 mm) | No response | potential insitu upgrading - no discharge activity |
| Possible Diluent or Fluidization Materials | Amorphous Carbon (<150 micron) | No response | none |
| | Amorphous Carbon (420-841 micron) | Some sparking, plasma formation | possible indication of improved discharge w/larger coal particles |
| | Char (<250 micron) | Dramatic discharging, intermediate duration | Ideal diluent material to prevent caking and improve discharges/plasma stability |
| | Graphite (fines) | Strong-localized discharges, highest heat generation | Indication of desired char properties |

TABLE 6-continued

An incomplete list of appropriate catalysts with summarization of the performance and certain characteristics of each catalyst.

| Class | Material (size) | Discharge Characteristics | Catalytic Potential |
|---|---|---|---|
| | alpha-Alumina (~150 micron) | No response | none |
| | Silicon carbide (23 micron) | No response | none |
| | Silicon carbide (100 micron) | No response | none |
| | Silicon carbide (150 micron) | No response | none |
| | HS-5 Silica (fumed silica) | No response | none - current diluent to avoid caking |

Table 6 contains a summary of the performance and characteristics of a variety of catalysts, including those that exhibit dielectric discharge, hydrogen formation, and/or dilution characteristics. As described elsewhere herein, initiation of dielectric discharge is a critical function of suitable catalysts according to embodiments of the present invention. In addition to those shown in Table 6, rapid heating and ignition of dielectric discharges were observed for copper wire, magnetite, and iron filings in argon and air flows.

Dielectric discharge was observed from iron filings in separate experiments, even though no appreciable coal conversion or dielectric discharges were observed for the coal with Fe-filings in experiment MWPy008. A potential cause for this discrepancy is poor energy absorption. The lack of coal heating or dielectric discharges was hypothesized to be related to the distribution of the electromagnetic energy fields within the reactor's MW oven cavity. Accordingly, in some embodiments, stainless steel wires can be inserted around the coal bed to enhance energy conversion at and around the coal bed. After inserting the metal wires, a successful plasma ignition between the wires was observed and plasma-induced coal conversion was successful, as shown for experiment MWPy009 in Table 5.

In addition, the catalytic materials tested in Table 6 were re-evaluated for the potential ability to catalyze dielectric discharges and/or plasma formation when physically mixed with amorphous carbon. In all cases when the materials were packed in a manner in which there was a continuous bed of solids where all particles were touching, no dielectric discharges or plasmas were observed. However, when the materials were dispersed slightly, dramatic discharges were observed indicating that the use of any material that promotes dielectric discharges or plasmas can be used in the continuous flow process to enable plasma and dielectric discharge generation at pressures greater than 0.9 atm, thus enabling plasma and dielectric discharge conversion of coal and other HFH to occur at pressures outside the traditional envelope of high-vacuum plasma applications.

Conversion product yields from Pitt #8 coal in nitrogen flow were 10.1 wt % (as rec'd) gas, 36.6 wt % (as rec'd) THF soluble products, and 53.3 wt % (as rec'd) char. The composition of the gas recovered from the MWPy009 experiment is presented in Table 7. The total recovered tar/oil extracts (47.9 wt %) contained ~33 wt % (as received) pentane soluble oil product, which would be considered material that can be upgraded to a JP-8 fuel.

TABLE 7

Summary of the composition of the gas recovered from conversion of MWPy009.

| Gas | Mole (%) |
|---|---|
| N2 | 73.9 |
| O2 | 1.0 |
| H2 | 11.5 |
| CH4 | 7.8 |
| Ethane | 0.97 |
| Ethylene | 1.3 |
| CO | 2.8 |
| CO2 | 0.63 |

Table 8 shows the products and repeatability of MW-induced conversion within the static coal reactor when stainless steel wires are inserted into the static coal bed. For each experiment nitrogen sweep gas was continuously passed over the coal bed. The gas composition for MWPy011 and MWPy012 is shown in Table 9. A significant amount of hydrogen gas is directly generated from the coal during MW-induced conversion, and the majority of the carbon-containing species were methane, ethane and ethylene with some CO and $CO_2$ formation due to liberation of oxygen from the coal.

TABLE 8

Product Distribution and Repeatability of MW-Induced Coal Conversion with Stainless Steel Wires Inserted into a Static Coal Bed under Nitrogen Flow

| Run ID: | Coal | Catalyst | MW time (min) | Coal Load (g) | Char Yield wt (g) | Char Yield wt % | Gas Yield wt (g) | Gas Yield wt % | Pentane Insol. wt (g) | Pentane Insol. wt % | Pentane Sol. wt (g) | Pentane Sol. wt % | Total Tar Yield (THF Sol) wt (g) | Total Tar Yield (THF Sol) wt % | Mass Balance |
|---|---|---|---|---|---|---|---|---|---|---|---|---|---|---|---|
| MWPy011 | Pitt | steel wires | 5 | 2.03 | 1.19 | 58.6% | 0.285 | 14% | 0.032 | 1.6% | 0.53 | 26.0% | 0.56 | 27.6% | 100.2% |
| MWPy012 | Pitt | steel wires | 5 | 2.02 | 1.001 | 49.6% | 0.131 | 6% | 0.035 | 1.7% | 0.70 | 34.7% | 0.74 | 36.4% | 92.4% |

TABLE 9

Gas compositions resulting from the MW-induced conversion of Pitt#8.

| | Composition mole % | |
|---|---|---|
| Gas | MWPy011 | MWPy012 |
| H2 | 16.76 | 7.173 |
| CO2 | 0.373 | 0.322 |
| ethylene | 0.905 | 0.545 |
| ethane | 0.337 | 0.523 |
| AR/O2 | 1.321 | — |
| N2 | 71.089 | 85.639 |
| CH4 | 6.913 | 4.552 |
| CO | 2.302 | 1.246 |

Figure 2:
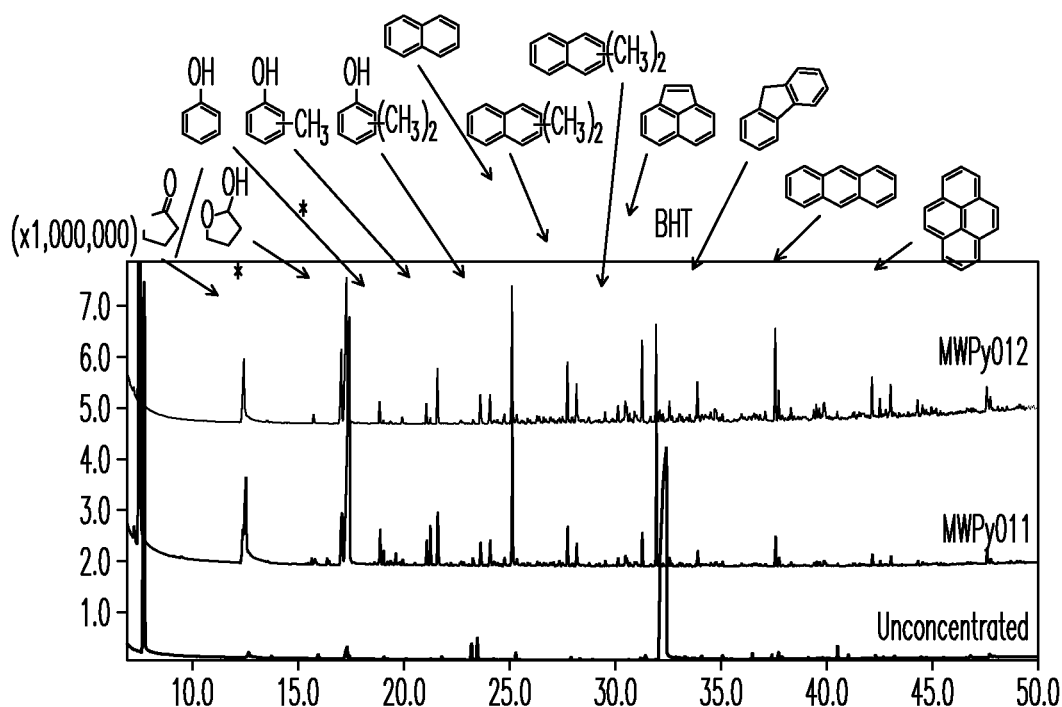
FIG. 2 is a chromatogram from gas chromatography-mass spectrometry (GCMS) showing products from two samples (MWPy011 and MWPy012) after microwave conversion.
Figure 3:
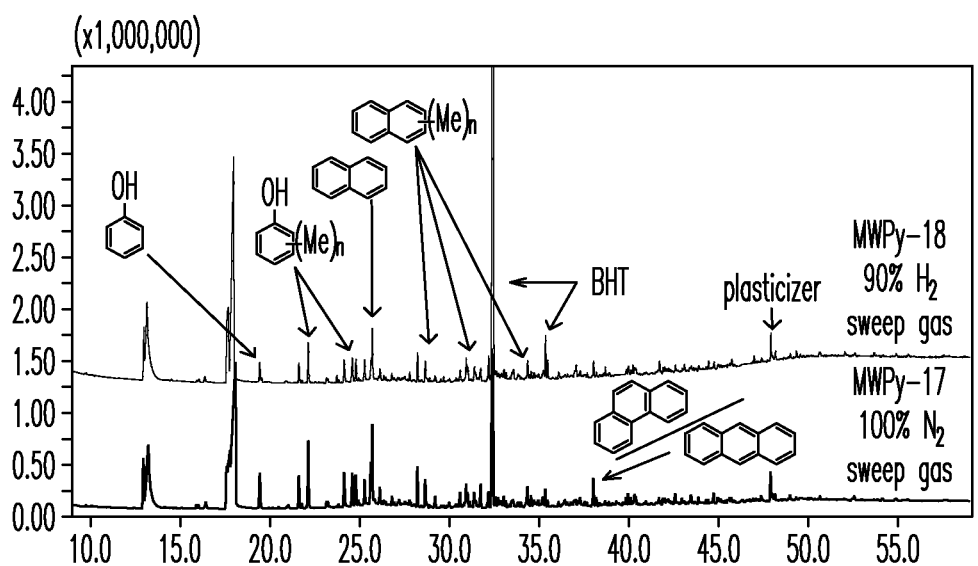
FIG. 3 is a GCMS chromatogram illustrating the effect of nitrogen and hydrogen sweep gas on the composition of the pentane soluble fraction.

The pentane soluble fraction's composition was analyzed by GCMS and is presented in FIG. 2 for MWPy011 and MWPy012. Prior to pentane and THF removal (see "unconcentrated" in FIG. 2), the majority the product signal is relatively weak due to saturation by pentane and THF, however the major compounds including benzene and toluene were observed. Removal of the solvent from the fraction allowed for more detailed analysis. The majority of the products were two- and three-ringed aromatics along with PCX species, which is very similar to the product distribution from thermal conversion of Pitt #8 coal. This indicates that during microwave-induced conversion the coal is undergoing conversion in a similar manner as thermally-induced conversion To improve the hydrogen content of the products of MW-induced conversion hydrogen and/or methane gas was used as a hydrogen source. Table 10. Effect of Nitrogen and Hydrogen Sweep Gas on Product Yields during Static MW shows the effect of 90% hydrogen gas in 10% nitrogen as a sweep gas during static microwave-conversion of Pitt #8 coal without a catalyst. Introduction of hydrogen to the system reduced the overall liquid and gas product yield and resulted in plugging of the reactor tube within 6 minutes. Furthermore the mass balance was reduced, which through later experimentation was shown to be a result of loss of lighter hydrocarbons and BTX components during solvent removal. Although the yields were reduced there was a reduction in the phenols, cresols, and xylenols (PCX) content of the collected liquid products (as shown in FIG. 3) that were pentane soluble, which is consistent with the reduced mass balance as a result of BTX and lighter hydrocarbon yields that were not collected or accounted for in the yield calculations.

TABLE 10

Effect of Nitrogen and Hydrogen Sweep Gas on Product Yields during Static MW Conversion

| | Purge | | MW time | Coal Load | Char Yield | | Gas Yield | | Pentane Insolubles | | Pentane Solubles | | Total Tar (THF Sol) | | Mass |
|---|---|---|---|---|---|---|---|---|---|---|---|---|---|---|---|
| Run ID | Gas | Catalyst | (min) | (g) | wt (g) | wt (%) | wt (g) | wt (%) | wt (g) | wt (%) | wt (g) | (%) | wt (g) | wt (%) | Balance |
| MWPy017 | N2 | none | 7 | 2.02 | 1.060 | 52.5% | 0.179 | 8.9% | 0.1 | 5.0% | 0.29 | 14.4% | 0.39 | 19.3% | 80.6% |
| MWPy018 | 90% H2 | none | 6 | 2.08 | 1.217 | 58.5% | 0.1083 | 5.2% | 0.062 | 3.0% | 0.16 | 7.7% | 0.222 | 10.7% | 74.4% |

Table 11. Effect of $N_2$, $H_2$, and $CH_4$ Sweep Gas on Product Yields during MW shows the products formed during microwave-induced conversion of a static Pitt #8 coal bed as a function of sweep gas used. For all tests the microwave heating time was 5 minutes, a total gas flow rate of 200 sccm, and 2 g of coal was used. Under similar conditions as before (MWPy-011 and MWPy-012), the result of using a the modified microwave oven system (i.e., lower power microwave source and addition of a water dummy load) reduced the overall product yield for experiment MWPy038.

TABLE 11

Effect of $N_2$, $H_2$, and $CH_4$ Sweep Gas on Product Yields during MW Conversion

| | Sweep | | net gas formed | | CHAR | | Oil Yield (pentane sol.) | | Pentane Insoluble Oil | | Tar Yield (THF Sol.) | | mass balance |
|---|---|---|---|---|---|---|---|---|---|---|---|---|---|
| Run ID | Gas | Catalyst | wt (g) | wt % | wt (g) | wt % | wt (g) | wt % | wt (g) | wt % | wt (g) | wt % | % |
| MWPy038 | N2 | none | 0.158 | 10.5 | 0.950 | 62.9 | 0.302 | 20.0 | 0.06 | 4.0 | 0.362 | 24.0 | 97.4% |
| MWPy030 | 90% H2 | none | 0.035 | 2.1 | 1.360 | 83.4 | 0.088 | 5.4 | 0.13 | 8.0 | 0.218 | 13.4 | 98.9% |
| MWPy035 | 90% CH4 | none | 0.061 | 4.1 | 0.860 | 57.3 | 0.274 | 18.3 | 0.14 | 9.3 | 0.414 | 27.6 | 89.0% |

Figure 4:
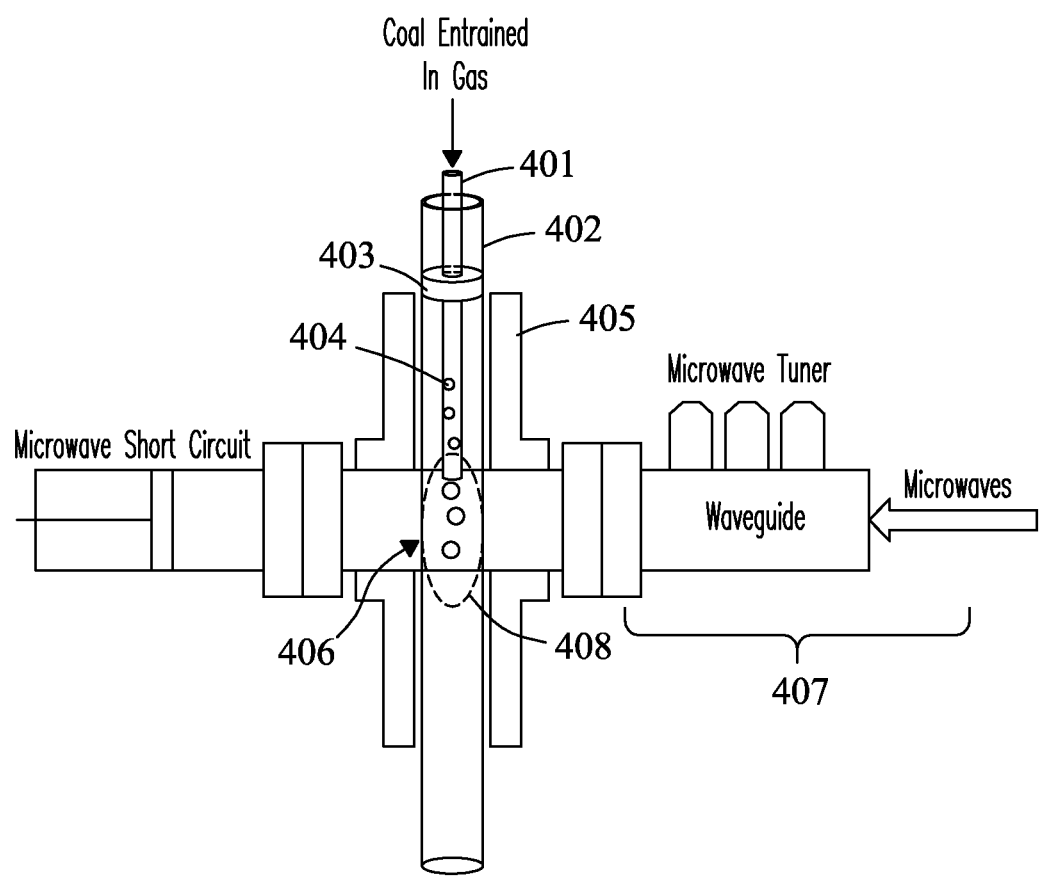
FIG. 4 is a diagram of a system for continuous flash conversion of HFH, according to one embodiment of the present invention.

Referring to FIG. 4, a continuous reactor is depicted through which a continuous feed comprising HFH (e.g., coal) 404 and a process gas is continuously fed through a region 406 irradiated by radio frequency or microwave energy. The reactor comprises a feed tube 401, through which the coal entrained in a reactive gas enters the reaction zone 406, within an outer tube 405 through which the additional process gas 402 flows. The RF or microwave source 407 irradiates a region composing a reaction zone 406. In some instances, a plasma 408 forms in, or near, the reaction zone. An exemplary outer tube can comprise a quartz tube. An exemplary feed tube can comprise an alumina tube. A gas-flow distributor disk 403 can be placed upstream from the reaction zone. In an applied process, microwave or RF energy can be introduced perpendicularly (as shown in FIG. 4) to the reaction zone. Alternatively, the microwave or RF energy can be co-introduced co-currently or counter-currently (i.e., parallel) to the flow of HFH and the process gas(es). This also enables the reactor and process reactor materials to be constructed of a wide-range of materials including, but not limited to steels, ceramics, and other engineered materials.

Figure 5:
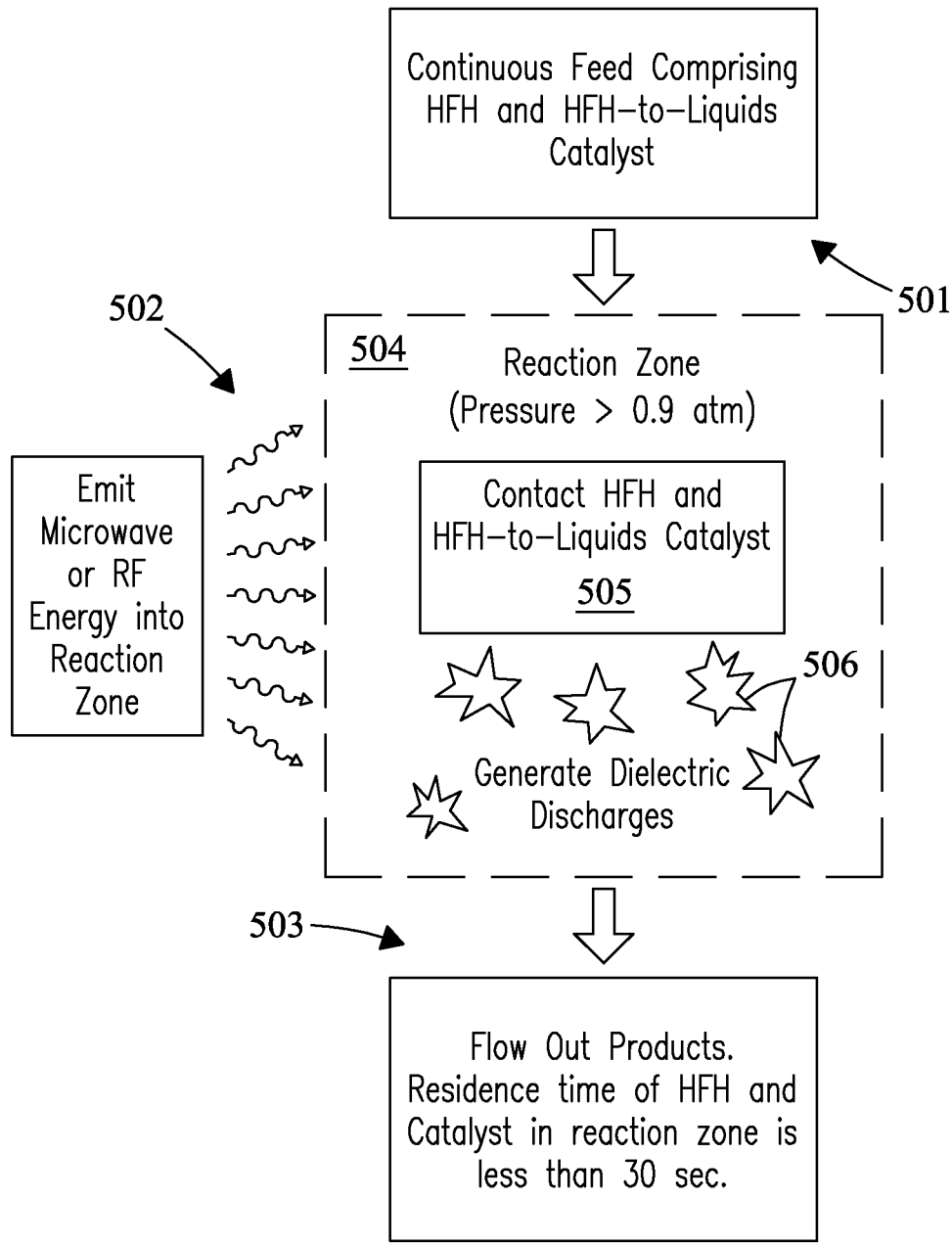
FIG. 5 is a diagram depicting a process of continuous conversion of HFH according to embodiments of the present invention.

FIG. 5 is a schematic diagram depicting the process of continuous conversion of HFH according to embodiments of the present invention. A continuous feed, which comprises HFH and a process gas, and a HFHTL catalyst are flowed 501 to the reaction zone 504, which has a pressure greater than 0.9 atm. The HFH can be between 0.1% and 100% by weight of the continuous feed. In some embodiments, the HFH can be between 0.5 wt % and 95 wt % of the continuous feed, between 4 wt % and 93 wt % of the continuous feed, or between 8 wt % and 93 wt % of the continuous feed. Generally, the HFH concentration in the process gas should be as high as possible to ensure maximum efficiency and product generation. At that same time, the concentration of the process gas should be sufficiently high to increase the hydrogen-to-carbon ratio of the final products and to ensure stable reactor performance.

In at least the reaction zone, the HFH and HFHTL catalyst are contacted 505. Microwave or RF energy is emitted 502 into the reaction zone from a source. Dielectric discharging 506 occurs in at least the reaction zone to promote conversion of the HFH. Products and waste flow out 503 of the reaction zone. The HFH and HFHTL catalyst have a residence time of less than 30 seconds in the reaction zone.

Table 12 summarizes the product yields from microwave conversion of Pitt #8 coal under various conditions in a continuous flow-reactor such as the one depicted by FIG. 4 and/or according to methods described in FIG. 5. Without catalyst addition, the oil yield is ~20 wt % (daf) under both nitrogen and hydrogen (25% hydrogen in nitrogen) flow entrainment. Under the same conditions and coal feed rate, the addition of the Fe-powder CTL catalyst significantly enhanced the oil yield to nearly 42 wt % (daf). Included in the oil product distribution was a substantial increase in the formation of light hydrocarbons, mainly benzene and other mono-aromatic and cyclo-paraffin compounds, as shown in Table 13. In some embodiments, the microwave power can range between 0.1 and 100 MW-hr per ton of HFH. Relatively lower microwave powers can help reduce the intensity of the plasma formed and increase the relative degree of dielectric discharging between coal particles. By increasing dielectric discharges and reducing the plasma intensity, the oil yield increased relative to the BTX yield, which was reduced more dramatically. Although the net oil yield was reduced, the yield of non-BTX compounds within the distillate fuel boiling ranges remained consistent (~28-30 wt %), suggesting that BTX yield can be increased or decreased by adjusting the relative degree of plasma energy intensity resulting in a higher number of plasma ions reacting directly with the coal (and volatilized products) to form acetylene, which then undergoes oligomerization and other polymerization reactions. Accordingly, in some embodiments, at least a portion of the residual char is further reacted with a reactive plasma, such as hydrogen, to yield acetylene and other chemicals that could be used to increase distillate fuels production and/or help offset production costs through production of value-added chemicals (such as acetylene, BTX, styrene, ethyl-benzene, aromatics, olefins, and LPG) from the char.

During plasma conversion the reactive plasma ions can react directly with the coal or HFH to form acetylene that then polymerizes to yield benzene, styrene, and other polymeric products. The increased BTX compounds can be a result of plasma-induced ring-opening reactions of hydroaromatics, which are formed during catalytic hydrogenation of naphthalenes and other polyaromatic species, followed by side-chain cleavage. The intensity of the plasma and the relative concentration of the reactive plasma ions can be controlled to maximize the yield of distillates and/or to minimize acetylene formation and over-cracking of the evolved oils.

TABLE 12

Product Yields from Continuous Microwave Conversion of Pitt Coal

| | Total Feed (g) | wt Coal Fed | wt % Char (daf) | Tar Yield (wt %) | total Oil (wt %, daf) | Total Liquid Yield (wt %, daf) | Total Mass Balance |
|---|---|---|---|---|---|---|---|
| MWPy-116, N2/no-cat | 4 | 2.8 | 58.4 | 2.0 | 19.7 | 21.7 | 84.4 |
| MWPy-120, H2/no-cat | 4 | 2.9 | 58.4 | 2.7 | 20.6 | 23.3 | 85.6 |
| MWPy-126, 25% H2/Fe Powder/1000 W | 15 | 11.6 | 18.8 | 3.0 | 41.9 | 44.9 | 71.6 |
| MWPy-134, 25% H2/Fe Powder/600 W | 18 | 13.8 | 26.9 | 9.1 | 33.1 | 42.2 | 75.8 |
| MWPy-142, 10% H2/Fe Powder/600 W | 4 | 2.9 | 35.6 | 2.1 | 30.9 | 33.0 | 75.5 |

TABLE 13

Conversion of Pitt Coal to Hydrocarbons below the JP-8 Boiling Range

| | Light Ends (wt %, daf) |
|---|---|
| MWPy-126, 25% H2/Fe Powder/1000 W | 13.86 |
| MWPy-134, 25% H2/Fe Powder/600 W | 5.61 |
| MWPy-142, 10% H2/Fe Powder/600 W | 0.54 |

In some embodiments, methane and HFH such as coal can be co-pyrolyzed. Methane conversion can lead to extensive carbon coating of the reactor walls. In one particular instance, an argon plasma can be pre-formed within the microwave zone to reduce the detrimental carbon build up. An inner feed tube supplying methane and coal was lowered to a position near the exit of the waveguide, thus preventing methane or coal conversion within the microwave zone. In the instant configuration, the coal and methane were introduced into the pre-formed Ar plasma and only in lower sections of the reactor was a methane/coal/Ar plasma observed. While carbon buildup was reduced within the microwave waveguide, the observed oil yields were relatively low, as shown in Table 14 Product Yields from Co-Conversion of Methane and Coal in a Microwave Plasma. Without the addition of hydrogen to the feed, the oil yield was only 14.8 wt % (total tar 26.6 wt %). Addition of a small amount of hydrogen increased the oil yield to 22.3 wt % but the total tar yield remained low at 24.5 wt %. Accordingly, in some embodiments, hydrogen can be introduced to aid in the conversion of asphaltenes to soluble oils without influencing the deconstruction of the coal into oils but rather promoting the formation of acetylene and gaseous hydrocarbons from methane and coal. Under the same conditions (1 atm pressure, no preheating, 18% $CH_4$/1.5% $H_2$ in Ar process gas, and coal feed rate of ~5 g/hr) the addition of a hydrotreating catalyst (CoMo/Al2O3) can improve the oil and tar yields to 29.7 and 38 wt %, respectively. During these tests the coal itself was not generating rapid dielectric discharges, which is likely due to little to no exposure to microwave irradiation prior to entering the preformed plasma.

In some embodiments, the coal feed rate is greater than 5 g/hr. For example, increasing the coal feed rate from ~5 g/hr to 30 g/hr dramatically improved dielectric discharging between coal particles, likely due to increased proximity and uneven charging of coal particles enabling corona discharging between particles. As a result of higher coal feed rates, the gas flow also can be increased from 4 L/min to 12 L/min to avoid reactor plugging due to coal swelling, which further improved dielectric discharges between coal particles. The increased flow rates results in a reduction of the residence time in the microwave zone from 126 to 75 msec. Increasing the coal feed-rate, from 5 to 30 g/hr, significantly increased the observation of dielectric discharging between coal particles (run MWPy-215 in Table 15 Product Yields from Co-Conversion of Methane, Hydrogen, and Coal in a Microwave Plasma). This increase in the dielectric discharging between coal particles resulted in a significant increase in oil yield to 35 wt % (daf), despite the reduced residence time. This indicates that operational parameters such as coal (or HFH) particle proximity, concentration, exposure time to microwave/RF irradiation, reactor configurations, wt % coal feed in the process gas, relative plasma position and energy density, and net residence time can all be adjusted and

TABLE 14

Product Yields from Co-Conversion of Methane and Coal in a Microwave Plasma

| | Total Char Yield (wt % daf) | Char Yield (wt % daf) | Tar Yield (wt % daf) | Oil Yield (wt % daf) | total Liquid Yield (wt % daf) | Net Gas Yield (wt %) | Overall Mass Balance (%) |
|---|---|---|---|---|---|---|---|
| MWPy-169, 5% Fe Catalyst, 6% CH4 in Ar | 85.63 | 64.05 | 11.79 | 14.80 | 26.59 | −5.51 | 92.82 |
| MWPy-201, 5% Fe Catalyst, 18% CH4/1.5% H2 in Ar | 73.61 | 55.72 | 2.26 | 22.32 | 24.58 | −0.67 | 99.26 |
| MWPy-203, 5% Fe Catalyst + 5% Hydrotreating Catalyst, 18% CH4/1.5% H2 in Ar | 68.88 | 32.82 | 8.28 | 29.72 | 38.01 | −2.61 | 97.22 |

To enhance dielectric discharges between coal particles, the reactor can be further modified to increase the exposure of coal to microwave energy by increasing the outer Ar sheath gas flow to avoid carbon coating on the wall of the reactor and/or by employing a modified flow distributor disk having a structure that resulted in higher gas velocity along the walls of the reactor. This enabled the inner feed tube to be raised above the main reaction zone, thus increasing the exposure time of the entrained coal to microwave irradiation. Alternative designs can be considered as part of the current embodiment that can include alternative methods to introduce coal, HFH, gases, and microwave/RF energies.

controlled to improve reactor performance, alter product distributions, increase product yields and reduce operational costs. Unlike the static bed tests, an entrained or fluidized coal bed can significantly enhance yields and performance by distributing the coal, catalyst, or dilution media within the process gas allowing for uneven electric charge buildup, whereas when particles are in direct contact the ability to generate uneven charge build up between particles is limited, thus reducing the degree of dielectric discharging between entrained particles.

TABLE 15

Product Yields from Co-Conversion of Methane, Hydrogen, and Coal in Microwave Plasma

| | Char Yield (wt % daf) | Tar Yield (wt % daf) | Total Oil Yield (wt % daf) | Total Liquid Yield (wt % daf) | Net Gas Yield (wt %) | BTX/Light HC Yield (wt %, daf) | Mass Balance (%) | CH4 Conversion (%) | H2 Conversion (%) |
|---|---|---|---|---|---|---|---|---|---|
| MWPy-211, 5% Fe Catalyst, 39:8:53 Coal:H2:CH4 (wt ratio) - 700 W | 59.70 | 0.85 | 24.36 | 25.23 | 7.47 | 10.86 | 96.61 | 3.90 | −7.88 |
| MWPy-215, 5% Fe Catalyst, 43:6:51 Coal:H2:CH4 (wt ratio) - 700 W | 45.60 | 7.13 | 34.87 | 41.99 | 0.46 | 17.85 | 89.17 | 11.25 | −17.30 |
| MWPy-219, 5% Fe Catalyst, 79:21 Coal:H2 (wt ratio) - 700 W | 37.40 | 3.71 | 58.49 | 62.19 | 1.90 | 23.98 | 98.90 | n.a. | 9.37 |

In some embodiments, hydrogen and coal are co-fed. To compare directly the effect of co-feeding methane versus co-feeding hydrogen, experiment MWPy-219 was performed and the results are shown in Table 15 Product Yields from Co-Conversion of Methane, Hydrogen, and Coal in a Microwave Plasma. By co-feeding hydrogen rather than methane during conversion significantly increased the oil yield to 58.5 wt % (daf) and the overall liquid yield was 62 wt % (daf). This increase is directly related to the need for increasing the plasma energy-density required for sufficient methane conversion during plasma conversion. During tests When methane is co-fed with the hydrogen and coal (with the Ni catalyst) the liquid yield further increased to 62 wt % and 34% of the methane was converted into other products, including hydrogen as indicated by the negative hydrogen conversion number (indicates more hydrogen is exiting the reactor than entering the reactor). This demonstrates one method in which energy required for methane decomposition can be lowered by variations in catalytic materials that can help promote hydrogenation, methane decomposition, and hydrogen formation.

TABLE 16

Summary of results when NiSAT ® catalyst is added to the coal feed mix for microwave conversion

| | Char Yield (wt % daf) | Tar Yield (wt % daf) | Total Oil Yield (wt % daf) | Total Liquid Yield (wt % daf) | Net Gas Yield (wt %) | BTX/Light HC Yield (wt %, daf) | Mass Balance (%) | CH4 Conversion (%) | H2 Conversion (%) |
|---|---|---|---|---|---|---|---|---|---|
| MWPy-263: Pitt#8 + 5% Fe Catalyst + 5% NISAT 6:1 Coal:H2, 29.4 g/hr coal feed rate 700 W microwave power 600 W Acoustic | 50.07 | 5.67 | 40.49 | 46.16 | 5.84 | 18.70 | 100.02 | n.a. | 16.94 |
| MWPy-265: Pitt#8 + 5% Fe Catalyst + 5% NISAT 8:1:8 Coal:H2:CH4, 29.7 g/hr coal feed rate 700 W microwave power 600 W Acoustic | 55.43 | 8.80 | 53.32 | 62.12 | −16.14 | 17.06 | 99.71 | 34.18 | −9.70 | without co-feed of coal, methane conversions as high as 75% per pass were observed and when coal is co-fed the methane conversion observed is ~4-11%. This is due to the need for methane to be exposed to a plasma having relatively higher energy density, which can be efficiently and readily generated in a plasma torch. If coal is pyrolyzed in a plasma torch reactor (or similarly a thermal plasma), the main product of coal conversion is acetylene and acetylene polymers and conversion is limited by mass transfer of the ions within the plasma to the surface of the coal. Testing performed indicates that a yield of oil under such operation leads to ~20-25 wt % (daf) and the product selectivity is ~80-85% BTX with only minimal conversion to distillate fuel boiling range compounds. However, by relatively increasing the intensity and occurrences of dielectric discharges the oil yield can be improved, but the lower-energy plasma is not sufficient for high methane conversions. Preferably, a natural gas conversion unit is segregated and hydrogen, rather than methane, is co-fed with the coal. In such instances, an oil yield of 58.5 wt % has been demonstrated. Due to the differences in the "mode" of operation required for optimal methane conversions and high oil yields from coal, preferred embodiments segregate the two processes and use RF or barrier discharge reactors for methane conversion and continue to use microwave energy for conversion of coal entrained in hydrogen (and other product gases from methane conversion).

Alternative catalytic materials can be used to help lower the energy requirements associated with co-feeding methane and coal, while improving overall methane conversions. An example of including a reduced nickel catalyst into the reaction zone is illustrated in Table 16 where NiSAT® catalyst (commercial Nickel-based catalyst Sud-Chemie) was added to the coal feed mix. In this particular example when hydrogen was co-fed with the coal the overall liquid yield was 46.16 wt %, indicating the Ni is also aiding in increasing the hydrogen transfer reaction thus increasing the oil yield when compared to the case without Ni catalyst.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method for continuous flash conversion of heavy fossil hydrocarbons (HFH), the method comprising:
   simultaneously providing both a continuous HFH feed and hydrogen-containing process gas feed to a reaction zone, wherein a mass ratio of the HFH feed to the hydrogen-containing process gas is greater than 3:1;
   dispersing the HFH feed in the process gas while maintaining a pressure of greater than 0.9 atm within the reaction zone; and
   concentrating microwave or RF energy in the reaction zone using a microwave or RE energy source to generate dielectric discharges within the reaction zone to flash convert the HFH.

2. The method of claim 1 wherein the HFH feed comprises one or more of coal, coal/biomass blends, oil sands, petroleum fractions, coke, char recycle, coal-derived materials.

3. The method of claim 1 wherein the HFH feed comprises coal.

4. The method of claim 3 further comprising continuously feeding the coal.

5. The method of claim 1 wherein the HFH feed comprises coal entrained in a reactive process gas.

6. The method of claim 1 wherein the hydrogen-containing process gas comprises one or more of nitrogen, carbon dioxide, methane, natural gas, recycle gas, carbon monoxide, argon, helium, water vapor, and/or oxygen.

7. The method of claim 1 wherein the ratio of HFH feed to the process gas is greater than 6:1.

8. The method of claim 1 wherein the HFH feed is pre-mixed with a portion of the process gas.

9. The method of claim 1 wherein the process gas feed is provided through a gas injector.

10. A method for continuous flash conversion of heavy fossil hydrocarbons (HFH), the method comprising:

continuously dispersing a HFH feed within a process gas to form a mixture of the HFH feed and the process gas within a reaction zone maintained at a pressure of greater than 0.9 atm, wherein the mixture comprises hydrogen, and a mass ratio of the HFH feed to the process gas within the mixture is greater than 3:1; and concentrating microwave or RF energy in the reaction zone using a microwave or RF energy source to generate dielectric discharges within the reaction zone to flash convert the HFH.

11. The method of claim 10 wherein the mixture comprises at least 0.5 weight percent HFH feed.

12. The method of claim 10 wherein the mixture comprises less than 95 weight percent HFH feed.

13. The method of claim 10 further comprising forming an ionized argon plasma within the reaction zone.

14. The method of claim 10 wherein the mixture resides in the reaction zone for less than 30 seconds.

* * * * *

UNITED STATES PATENT AND TRADEMARK OFFICE
CERTIFICATE OF CORRECTION

| | |
|---|---|
| PATENT NO. | : 11,021,661 B2 |
| APPLICATION NO. | : 13/401216 |
| DATED | : June 1, 2021 |
| INVENTOR(S) | : James J. Strohm et al. |

It is certified that error appears in the above-identified patent and that said Letters Patent is hereby corrected as shown below:

On the Title Page

(56) References Cited, page 2, 2nd Column, 26th Line – Replace "Fu, Yuan C., et al., "Pryolysis of Coals in a Microwave Discharge,"" with --Fu, Yuan C., et al., "Pyrolysis of Coals in a Microwave Discharge,"--

(56) References Cited, page 2, 2nd Column, 27th Line – Replace "American Chemcial Society, vol. 8, No. 2, 1969, pp. 257-262," with --American Chemical Society, vol. 8, No. 2, 1969, pp. 257-262,--

(56) References Cited, page 2, 2nd Column, 40th Line – Replace "Magnetization Enchancement," IEEE Transaction on Magnetics," with --Magnetization Enhancement," IEEE Transactions on Magnetics,--

(56) References Cited, page 2, 2nd Column, 53rd Line – Replace "an Indoesian Low-Rank Coal," American Chemical Society, 2013," with --an Indonesian Low-Rank Coal," American Chemical Society, 2013,--

(56) References Cited, page 2, 2nd Column, 56th Line – Replace "on the Liquefaction of Turkish Coals by Microwave Engery in a" with --on the Liquefaction of Turkish Coals by Microwave Energy in a--

(56) References Cited, page 2, 2nd Column, 57th Line – Replace "Hydrogen Donor Solvent," Engery & Fuels, vol. 19, 2005, pp." with --Hydrogen Donor Solvent," Energy & Fuels, vol. 19, 2005, pp.--

In the Specification

Columns 7-8, TABLE 6 – Replace "with summarization of the performance" with --with summarizations of the performance--

Columns 9-10, TABLE 6 – Replace "with summarization of the performance" with --with summarizations of the performance--
Column 12, Line 4 – Replace "conversion" with --conversion.--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*

Column 12, Line 47 – Replace "using a the modified microwave" with --using a modified microwave--

Column 18, Line 49 – Replace "microwave or RE energy" with --microwave or RF energy--